US 8,431,881 B2

(12) United States Patent
Filipovich et al.

(10) Patent No.: US 8,431,881 B2
(45) Date of Patent: Apr. 30, 2013

(54) NIGHT VISION GOGGLES WITH PELLICLE

(75) Inventors: Danny Filipovich, Lincolnwood, IL (US); Jack C. Fiore, Inverness, IL (US); Robert O. Ziv, Waban, MA (US)

(73) Assignees: Kollsman, Inc., Merrimack, NH (US); Night Vision Corporation, Lincolnwood, IL (US)

( * ) Notice: Subject to any disclaimer, the term of this patent is extended or adjusted under 35 U.S.C. 154(b) by 106 days.

(21) Appl. No.: 12/693,978

(22) Filed: Jan. 26, 2010

(65) Prior Publication Data

US 2010/0128135 A1    May 27, 2010

Related U.S. Application Data

(60) Division of application No. 11/419,378, filed on May 19, 2006, now Pat. No. 7,800,043, which is a continuation-in-part of application No. 10/343,581, filed as application No. PCT/US01/28723 on Sep. 14, 2001, now Pat. No. 7,072,107, said application No. 11/419,378 is a continuation-in-part of application No. 10/250,388, filed as application No. PCT/US01/49988 on Dec. 29, 2001, now Pat. No. 7,170, 057.

(60) Provisional application No. 60/258,648, filed on Dec. 29, 2000, provisional application No. 60/232,720, filed on Sep. 15, 2000.

(51) Int. Cl.
*H01J 31/50* (2006.01)
*H01J 43/30* (2006.01)

(52) U.S. Cl.
USPC ............. 250/214 VT; 359/407; 359/411; 359/419

(58) Field of Classification Search .......... 250/207, 250/214 VT; 359/404–419, 480–482
See application file for complete search history.

(56) References Cited

U.S. PATENT DOCUMENTS 3,402,977 A    9/1968    Russa et al.
3,454,773 A    7/1969    Bulthuis et al.
(Continued)

FOREIGN PATENT DOCUMENTS

CA    2432206 A1    8/2002
JP    6188215    5/1986
(Continued)

OTHER PUBLICATIONS

U.S. Appl. No. 10/343,581, Office Action mailed Jul. 8, 2004.
(Continued)

*Primary Examiner* — Francis M Legasse, Jr.
(74) *Attorney, Agent, or Firm* — Conley Rose, P.C.

(57) ABSTRACT

A night vision goggle system is shown, including optical modules, a heads-up display (HUD) module, and a camera module. Each module may be added to and removed from the system without structural, electrical, or optical damage to itself or the remaining modules. Each optical module takes input light at one end and provides an intensified image at the other. A heads-up display module (HUD) can provide an informational display in any of at least two of the optical modules or both. A camera module is capable of recording both the intensified image produced by a particular optical module, as well as the HUD information shown through that module with substantially no offset from the original display. Both the camera module and the HUD module are installable onto the same optical module at the same time, and can be installed on either (or in some embodiments, any) optical module.

10 Claims, 14 Drawing Sheets

U.S. PATENT DOCUMENTS

| | | | |
|---|---|---|---|
| 3,744,884 | A | 7/1973 | Carlson et al. |
| 3,865,468 | A | 2/1975 | Holcomb |
| 3,906,529 | A | 9/1975 | Filipovich et al. |
| 4,000,419 | A | 12/1976 | Crost et al. |
| 4,005,447 | A | 1/1977 | Filipovich |
| 4,037,921 | A | 7/1977 | Cox |
| 4,134,129 | A | 1/1979 | Filipovich |
| 4,145,142 | A | 3/1979 | Mikeman |
| 4,150,888 | A | 4/1979 | Filipovich |
| 4,205,894 | A | 6/1980 | Filipovich et al. |
| 4,266,848 | A | 5/1981 | Schlegel |
| 4,323,298 | A | 4/1982 | Brennan |
| 4,449,787 | A | 5/1984 | Burbo et al. |
| 4,463,252 | A | 7/1984 | Brennan et al. |
| 4,468,101 | A | 8/1984 | Ellis |
| 4,629,295 | A | 12/1986 | Vogl |
| 4,639,099 | A | 1/1987 | Tanaka et al. |
| 4,653,879 | A | 3/1987 | Filipovich |
| 4,655,562 | A | 4/1987 | Kreitzer et al. |
| 4,660,943 | A | 4/1987 | Ellis |
| 4,689,834 | A | 9/1987 | McCarthy et al. |
| 4,697,783 | A | 10/1987 | Kastendieck et al. |
| 4,757,378 | A | 7/1988 | Hackett, Jr. et al. |
| 4,775,217 | A | 10/1988 | Ellis |
| 4,818,065 | A | 4/1989 | Ziph et al. |
| 4,907,296 | A | 3/1990 | Blecha |
| 4,915,487 | A | 4/1990 | Riddell et al. |
| 4,922,550 | A | 5/1990 | Verona et al. |
| 4,961,626 | A * | 10/1990 | Fournier et al. ............... 359/630 |
| 5,000,556 | A | 3/1991 | Katsuma |
| 5,079,416 | A | 1/1992 | Filipovich |
| 5,084,780 | A * | 1/1992 | Phillips ........................ 359/350 |
| 5,229,598 | A | 7/1993 | Filipovich |
| 5,254,852 | A | 10/1993 | Filipovich et al. |
| 5,307,204 | A | 4/1994 | Dor |
| 5,404,225 | A | 4/1995 | Bushman |
| 5,416,315 | A | 5/1995 | Filipovich |
| 5,468,064 | A | 11/1995 | Lengyel |
| 5,535,053 | A | 7/1996 | Baril et al. |
| 5,579,158 | A | 11/1996 | Padula |
| 5,604,631 | A | 2/1997 | Gelardi et al. |
| 5,604,634 | A | 2/1997 | Khoury |
| 5,666,227 | A | 9/1997 | Ben-Ghiath |
| 5,703,354 | A | 12/1997 | Wannagot et al. |
| 5,729,010 | A * | 3/1998 | Pinkus et al. ............ 250/214 VT |
| 5,797,050 | A | 8/1998 | Smith |
| 5,852,291 | A | 12/1998 | Thomas |
| 5,886,822 | A | 3/1999 | Spitzer |
| 5,946,132 | A | 8/1999 | Phillips |
| 6,075,644 | A | 6/2000 | Filipovich |
| 6,088,165 | A | 7/2000 | Janeczko et al. |
| 6,196,845 | B1 | 3/2001 | Streid |
| 6,198,090 | B1 | 3/2001 | Iosue |
| 6,201,640 | B1 | 3/2001 | Caplan et al. |
| 6,201,641 | B1 | 3/2001 | Filipovich |
| 6,462,861 | B2 | 10/2002 | Ohshima |
| 6,462,867 | B2 | 10/2002 | Choinere |
| 6,462,894 | B1 | 10/2002 | Moody |
| 6,493,137 | B1 | 12/2002 | Solinsky et al. |
| 6,560,029 | B1 | 5/2003 | Dobbie et al. |
| 6,639,706 | B2 * | 10/2003 | Ziv et al. ........................ 359/238 |
| 6,924,931 | B1 * | 8/2005 | Lam et al. ...................... 359/404 |
| 7,496,293 | B2 | 2/2009 | Shamir et al. |
| 2002/0135872 | A1 | 9/2002 | Choinere |
| 2004/0021938 | A1 | 2/2004 | Filipovich |
| 2004/0042086 | A1 * | 3/2004 | Beystrum et al. ............. 359/629 |
| 2004/0094700 | A1 | 5/2004 | Filipovich et al. |

FOREIGN PATENT DOCUMENTS

| | | |
|---|---|---|
| JP | 1048533 | 2/1998 |
| WO | 02059654 A2 | 8/2002 |

OTHER PUBLICATIONS

U.S. Appl. No. 10/343,581, Response filed Jan. 7, 2005.
U.S. Appl. No. 10/343,581, Office Action mailed Jul. 8, 2005.
U.S. Appl. No. 10/343,581, Response filed Dec. 8, 2005.
U.S. Appl. No. 10/343,581, Notice of Allowance mailed Feb. 6, 2006.
Serial No. JP 2004/599371, Translation of Office Action dated Mar. 3, 2009.
U.S. Appl. No. 11/419,378, Office Action mailed May 12, 2008.
U.S. Appl. No. 11/419,378, Response filed Aug. 12, 2008.
U.S. Appl. No. 11/419,378, Office Action mailed Dec. 24, 2008.
U.S. Appl. No. 11/419,378, Response filed Mar. 24, 2009.
U.S. Appl. No. 11/419,378, Office Action mailed Apr. 14, 2009.
U.S. Appl. No. 11/419,378, Response filed Aug. 14, 2009.
U.S. Appl. No. 11/419,378, Notice of Allowance mailed Nov. 6, 2009.
U.S. Appl. No. 11/419,378, Notice of Allowance mailed May 3, 2010.
Serial No. EP 2001/975208, Response filed Aug. 11, 2006.
Serial No. CA 2,422,304, Response filed Nov. 19, 2004.
Serial No. CA 2,422,304, Office Action mailed Jul. 21, 2006.
Serial No. CA 2,422,304, Response filed Jan. 15, 2007.
Serial No. CA 2,422,304, Office Action dated Feb. 22, 2007.
Serial No. CA 2,422,304, Response filed Jun. 28, 2007.
Serial No. EP 2001/975208, EP Search Report dated Feb. 4, 2005.
Serial No. EP 2001/975208, Office Action dated Feb. 16, 2006.
Serial No. EP 2001/975208, Office Action dated Jul. 30, 2007.
Serial No. PCT/US01/49988, International Preliminary Examination Report dated Mar. 4, 2003.
Serial No. EP 2001/994400, Office Action dated Feb. 9, 2006.
Serial No. PCT/US01/028723, Amendment in Response to First Written Opinion filed Nov. 5, 2002.
Serial No. JP 2004/509371, Office Action dated Feb. 9, 2009.
Serial No. PCT/US01/49988, Search Report dated Aug. 30, 2002.
Serial No. PCT/US01/028723, Written Opinion dated Sep. 5, 2002.
Serial No. PCT/US01/028723, Response to Written Opinion filed Nov. 5, 2002.
Serial No. PCT/US01/028723, Search Report dated Dec. 27, 2001.
Serial No. PCT/US01/49988, Written Opinion dated Nov. 8, 2002.
Serial No. PCT/US01/028723, Corrected International Preliminary Examination Report dated Sep. 12, 2003.
U.S. Appl. No. 10/250,388, Office Action mailed Nov. 16, 2005.
U.S. Appl. No. 10/250,388, Corrected Response filed Apr. 2, 2006.
U.S. Appl. No. 10/250,388, Supplemental Response filed Sep. 1, 2006.
U.S. Appl. No. 10/250,388, Notice of Allowance mailed Sep. 29, 2006.
U.S. Appl. No. 10/250,388, Issue Notification mailed Jan. 30, 2007.
Dec. 21, 2010 Office Action, U.S. Appl. No. 12/731,213.
Jun. 21, 2011 Response to Office Action, U.S. Appl. No. 12/731,213.
Oct. 19, 2011 Office Action, U.S. Appl. No. 12/731,213.
Apr. 16, 2012 Response to Office Action, U.S. Appl. No. 12/731,213.
May 15, 2012 Notice of Allowance, U.S. Appl. No. 12/731,213.
Jul. 19, 2012 Response to Reasons for Allowance, U.S. Appl. No. 12/731,213.

* cited by examiner

DISPLAY IMAGE SUPERIMPOSED ON CENTRAL 40°
IMAGE INTENSIFIED SCENE IN EITHER OR BOTH
EYES. CAMERA VIEWS THE SAME AREA AS
THE DISPLAY.

NIGHT VISION GOGGLES WITH PELLICLE

CROSS-REFERENCE TO RELATED APPLICATIONS

This application is a divisional of U.S. patent application Ser. No. 11/419,378, which is a continuation-in-part of U.S. patent application Ser. No. 10/343,581 (now U.S. Pat. No. 7,072,107), having a 371(c) date of Jul. 28, 2004, which is an application under 35 USC §371 based on PCT/US01/28723 (published), having an international filing date of Sep. 14, 2001, which claimed priority to U.S. Provisional Application No. 60/232,720 (expired), filed Sep. 15, 2000; and U.S. patent application Ser. No. 11/419,378 is also a continuation-in-part of U.S. patent application Ser. No. 10/250,388 (now U.S. Pat. No. 7,170,057), filed Dec. 12, 2003, which is an application under 35 USC §371 based on PCT/US01/49988 (published), filed on Dec. 29, 2001, which claimed priority to U.S. Provisional Application No. 60/258,648, filed Dec. 29, 2000 (expired). This application claims priority to each of these prior applications.

TECHNICAL FIELD

This system relates generally to the field of optics and, more particularly, to a modular image enhancement system and method for night vision goggles having optics adapted to accommodate removably attachable and interchangeable modular components such as an outer optical module, a heads-up display (HUD), and/or a camera.

BACKGROUND

Existing night vision systems have many applications in everyday life. Perhaps the most well known use for night vision systems is by the military when performing nighttime maneuvers. The night vision systems permit vision under very low light conditions by converting incoming infrared and/or visible light from a viewed scene to an intensified visible light image. During nighttime maneuvers, military personnel are often performing other tasks, such as piloting an aircraft or driving a vehicle, that require the freedom of their hands while they visually scan the territory. Accordingly, night vision systems have been developed to be worn upon the head of a user, such as goggles being secured directly on the head or by being mounted to a helmet or a visor.

Placing a night vision system on the head of a user places significant constraints upon the optical design of the system. For example, goggles worn upon the head of a user must be both compact and light in weight because excessive weight or excessive front-to-back length of the goggles can cause the goggles to exert large moments on the user's head, causing severe instability problems and preventing their effective use in applications in which the user's head may be subjected to high gravitational or centrifugal loads. Furthermore, in a wide field-of-view optical system, the focal length of the eyepiece optics must be shortened correlatively with that of the wide angle objective for unity magnification. In night vision goggles, this results in insufficient eye relief between the eyepiece optics and the eye, which not only causes discomfort to the user, but also interferes with the ability to position a helmet visor, eyeglasses, and other structures between the goggles and the eyes of the user. In order to compensate for inadequate eye relief, prior night vision goggles have generally been limited to providing a field of view of no more than about 40 degrees.

Night vision goggles have been used in military aviation for several years with fields of view ranging from 30 degrees (Early Cat's Eyes night vision goggles from GEC-Marconi Avionics) to 45 degrees (NITE-OP and NITE-Bird night vision goggles, also from GEC-Marconi Avionics). The vast majority of night vision goggles used in military aviation have a 40-degree circular field of view (AN/AVS-6 and AN/AVS-9). A major limitation of such prior art devices is that increased field of view could only be obtained at the expense of resolution since each ocular uses only a single image intensifier tube and each image intensifier tube has a fixed number of pixels. Therefore, if the fixed numbers of pixels is spread over a larger field of view, then the angular subtense per pixel increases, which translates into reduced resolution. Understandably, increased field of view is a major enhancement desired by military aviators, closely followed by resolution. In conventional goggles, both eyes also typically see the same field of view, i.e., there is a 100-percent overlap of the image viewed by both eyes of the observer. Such a limited field of view greatly restricts the effectiveness of the night vision apparatus.

Night vision systems enjoying an enlarged or panoramic field of view of up to 60 degrees or more and having improved visual acuity have been developed to address this issue. Such systems include additional optical channels mounted adjacent the existing binocular channels to expand the field of view without sacrificing resolution. However, such systems are expensive and must necessarily obviate existing binocular systems when the user upgrades. Moreover, to upgrade from binocular to panoramic capabilities, the old binocular systems must be discarded and replaced by new panoramic systems. For many users, even those enjoying large military budgets, a large-scale upgrade thus represents a significant expense.

Further, as it is often the case that only a few individuals need panoramic night vision at any given time (and it is not always the same few), it is attractive to be able to purchase and use the less expensive binocular systems for the average user and stock only enough of the more expensive panoramic systems as is necessary. While it is not inconceivable to swap out panoramic night vision systems, such systems are often helmet mounted, with the helmets being customized to comfortably fit a single wearer. In addition, failure of any one of the panoramic channels means that the entire unit will be out of service while it is either repaired or replaced. Furthermore, the unitary design of some night vision goggles results in removal of one module affecting the performance (mechanically, optically, and/or electrically) of the remaining module(s).

In some existing night vision systems, a heads-up display may be shown in the field of view of the user by adding the HUD graphics to the output of one of the image intensifier channels. The channel through which the HUD is output, however, is not selectable to match the dominant eye of the user. In other systems, where the night vision goggles are fitted with a HUD and a camera for recording the scenery being viewed, the systems are unable to record both the scenery being viewed and the HUD content so that the recording matches substantially exactly what the user is being shown through the eyepiece.

Furthermore, many night vision systems fail to provide components that are modular in optical, mechanical, and electrical terms, so that removal of one component essentially disables the system mechanically, optically, and electrically. Many existing designs fail to take into account that most individuals have a dominant eye and a weaker eye, the systems having only a predetermined side on which the heads-up display can be shown. Still further, existing systems do not record both the heads-up display content and scenery when a camera/recorder is implemented.

Thus, a need still remains for a night vision system that is readily upgradeable from binocular to panoramic field of view, wherein the panoramic capability may be readily transferred from binocular unit to binocular unit, and wherein the failure of any given optical module does not require the entire unit to be out of service for any appreciable length of time. Various forms of the present invention address these needs, among others.

DESCRIPTION

Figure 1:
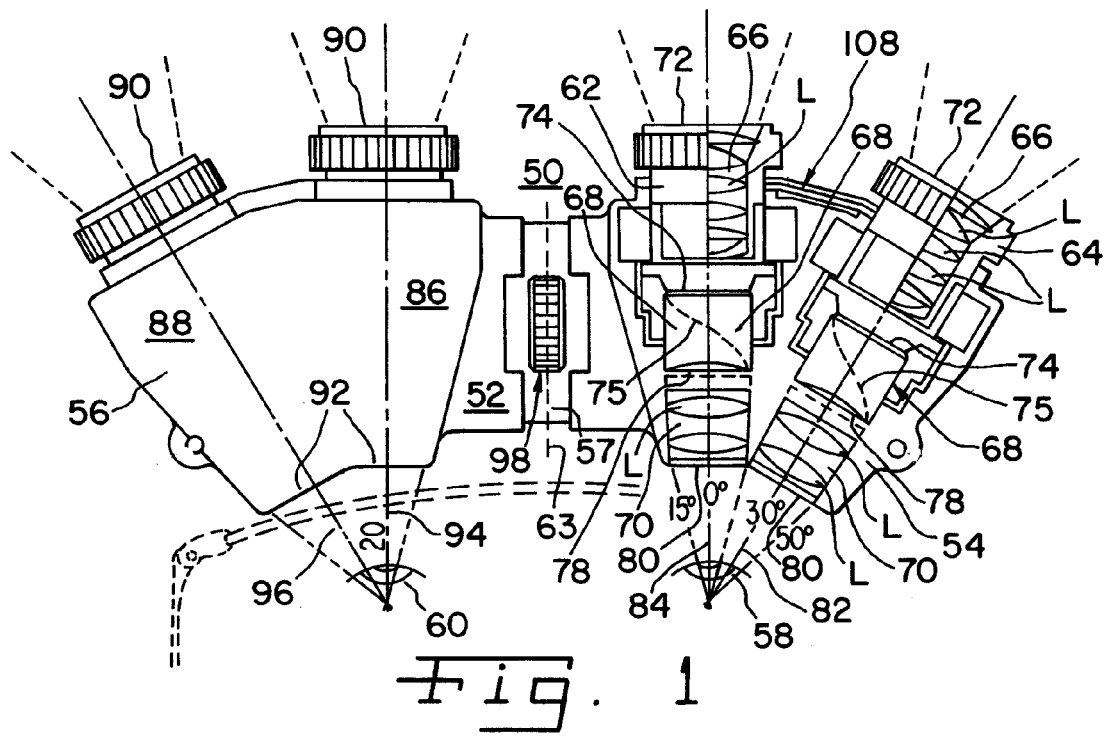
FIG. 1 is a top plan partial sectional view of a binocular-like vision system.

For the purposes of promoting an understanding of the principles of the invention and presenting its currently understood best mode of operation, reference will now be made to the embodiments illustrated in the drawings. It will nevertheless be understood that no limitation of the scope of the invention is intended by the specific language used to describe the invention, with such alterations and further modifications in the illustrated device and such further applications of the principles of the invention as illustrated therein being contemplated as would normally occur to one ordinarily skilled in the art.

Figure 2:
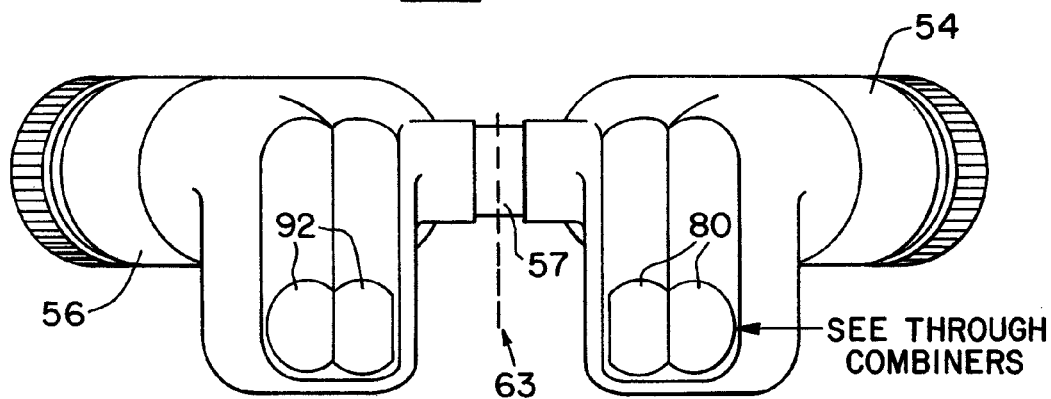
FIG. 2 is a rear view of the binocular-like vision system of FIG. 1.

In general, FIGS. 1 and 2 illustrate a panoramic night vision viewing system as described in U.S. Pat. Nos. 6,075, 644 and 6,201,641, both owned by Night Vision Corporation, a co-assignee of the present invention, wherein like elements are identified by like numerals. The vision system 50 is contained in a housing assembly 52 having a pair of housings 54 and 56 connected to one another by way of a bridge 57 and are arranged for respectively covering the right eye 58 and the left eye 60 of an observer. Each housing 54 and 56 contains identical optical systems that are mirror images of each other about a plane 63 (denoted by dashed lines) that bisects the housing assembly 52 as shown in FIG. 1. Accordingly, the following discussion regarding the housing 54 is equally applicable to the housing 56.

As detailed in FIG. 1, housing 54 includes two separate optical components 62 and 64. The inner optical component 62 has an optical structure identical to that of the outer optical component 64. Accordingly, the following discussion regarding the structure of the inner optical component 62 is equally applicable to the outer optical component 64. The inner optical component 62 includes three main optical structures: (1) an objective optical system 66; (2) an image intensifier tube 68; and (3) an eyepiece optical system 70. The objective optical system 66 typically includes approximately 6 to 8 optical elements, such as plastic or glass lenses L, which typically have an effective focal length of approximately 25 mm, F/1.2. The lenses L of the objective optical system 66 are typically spherical in design.

The objective optical system 66 further includes an input end 72, designed to receive light from an object being viewed at input end 72 and to transfer an image of an object to the photocathode side 74 of the image intensifier tube 68. The image intensifier tube 68 makes it possible for the observer to view an object in relatively dark conditions by receiving the visible and/or infrared light image of the object transferred from the input end 72 thereof. The image intensifier tube 68 converts the received image to an intensified visible output image in a predetermined narrow band of wavelengths at the output end 78 of the image intensifier tube 68. The output image is emitted in green phosphor light (known as "P-20" or "P43" light). Such an image intensifier tube 68 is well known in the art, although it will be appreciated that other image intensifier constructions could also be used. For example, the image intensifier tube 68 may include a GaAs photocathode at the input end 72. Vision system 50 of FIGS. 1-3 generally has an input end (72, 90) that receives light from an object and an optical transfer system (62, 64, 86, 88) that receives the intensified light received from the image intensifier tube 68 and transfers the intensified light to an output end (80, 92) of the system, wherein light transmitted out of the output end forms an intensified field of view of the object; typically, the view through system 50 is greater than a 60 degree horizontal field of vision.

Typically, image intensifier tube 68 also includes a fiber optic bundle (schematically shown at 75) for transmitting bits of image data from the photocathode input end 74 to the phosphor output end 78 thereof. The fiber optic bundle 75 is preferably twisted in a manner well known in the art to provide an image rotation of 180 degrees so that an upright image of the object will be presented to the eye of the user.

The intensified visible output image generated by the image intensifier tube 68 is transferred to an output end 80 of the inner optical component 62 via the eyepiece optical system 70. The light transmitted through the output end 80 is transmitted along the optical axis 84 that is aligned with the optical axis of the right eye 58.

In order to enlarge the field of view through system 50, an outer optical component 64 is provided that also directs light from the object to the observer. Like the inner optical component 62, the outer optical component 64 includes an objective optical system 66, an image intensifier tube 68 and an eyepiece optical system 70 that operate in the same manner as their counterparts in the inner optical component 62. Accordingly, the objective optical system 66 and the eyepiece optical system 70 of the outer optical component 64 each have an effective focal length of approximately 25 mm like their counterparts in the inner optical component 62. The input end 72 of the outer optical component 64 receives light from an object. The received light is then transferred via the objective optical system 66 to the image intensifier 68, which in turn generates an intensified image that is received by the eyepiece optical system 70. The eyepiece optical system 70 then sends the image to an output end 80 of the outer optical component 64. The light transmitted through the output end 80 travels along an optical axis 82 that is offset from the optical axis 84 by an angle typically ranging from approximately 30 degrees to 35 degrees, and which is more typically about 30 degrees.

The inner optical component 86 for the left eye 60 has the same structure and operates in the same manner as the inner optical component 62 for the user's right eye 58. Similarly, the outer optical component 88 for the left eye 60 has the same structure and operates in the same manner as the outer optical component 64. In other words, the inner and outer optical components 86 and 88 each receive light from an object at the input ends 90 and transfer their images of the object to respective output ends 92. As shown in FIG. 1, the image from the inner optical component 86 intensifier tube 68 is projected along an optical axis 94 that is aligned with the optical axis of the left eye 60 and, thus, substantially parallel to the optical axis 84 of the right eye. The image from the outer optical component 88 is projected along an optical axis 96 that is offset from the optical axis 94 by an angle typically ranging from 30 degrees to 35 degrees, and which is more typically about 30 degrees.

As best shown in FIG. 2, the two-eyepiece optical systems 70 for each of the housings 54 and 56 are positioned adjacent to each other so that the images at the output ends 80 and 92 appear continuous without a noticeable line of demarcation between the exit elements of the eyepiece optical systems. With respect to the forward looking direction, the two adjacent eyepiece optical systems for each housing 54 and 56 provide a continuous horizontal field of view that begins about 50 degrees to the right (or to the left) and ends 15 degrees to the left (or to the right).

As shown in FIG. 1, the optical systems are in line with the line of sight of the observer's eyes 58 and 60. In addition, as shown in FIG. 2, the output ends 80 and 92 may each be offset below their respective input ends 72 and 90. This is accomplished by inserting well known mirror systems or prism systems (not shown) between the output ends 78 of the image intensifier tubes 68 and the eyepiece optical components 70. The apparatus also includes a well known mechanism 98 in bridge 57 for adjusting the interpupillary distance between the eyepiece optical systems in the two housings 54 and 56 to accommodate different users.

Figure 3:
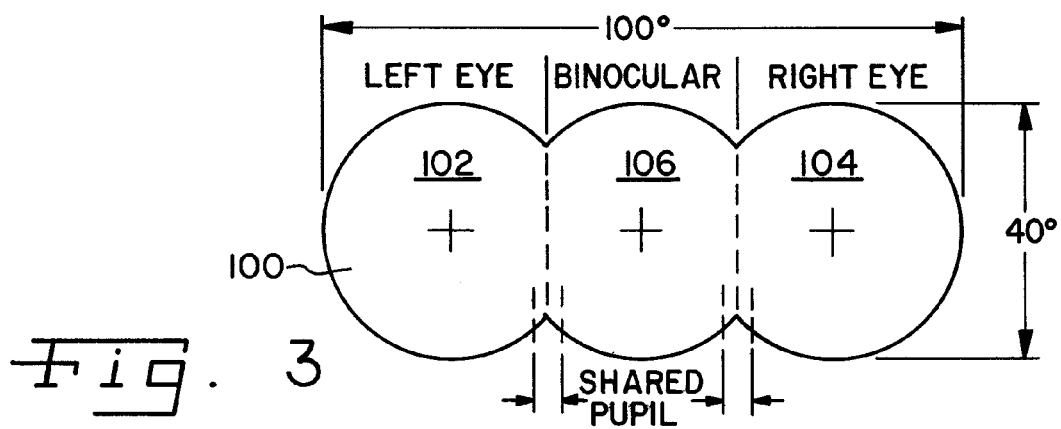
FIG. 3 schematically shows the field of view generated by the binocular-like vision system of FIG. 1.

The field of view 100 generated by the light simultaneously transmitted along the four optical axes 82, 84, 94, 96 to the observer of the system 50 is shown schematically in FIG. 3. The field of view 100 is the result of having the sub-fields of view formed from each of the output ends 80 and 92, which overlap one another. Each of the four sub-fields of view are circular, have a horizontal field of view of approximately 40 degrees, and have a vertical field of view of approximately 40 degrees. The field of view 100 includes two peripheral portions 102 and 104 that are separated from one another and that each have a monocular effect on the observer. The field of view 100 includes an overlapping central portion 106 spanning approximately 30 degrees. The central portion 106 is positioned between the monocular portions 102 and 104 and is viewed by both eyes 58 and 60 of the observer to provide full depth perception and exact stereo vision in the central portion 106. The combined field of view 100 has a vertical field of view of approximately 40 degrees and a horizontal field of view of approximately 100 degrees.

Figure 4:
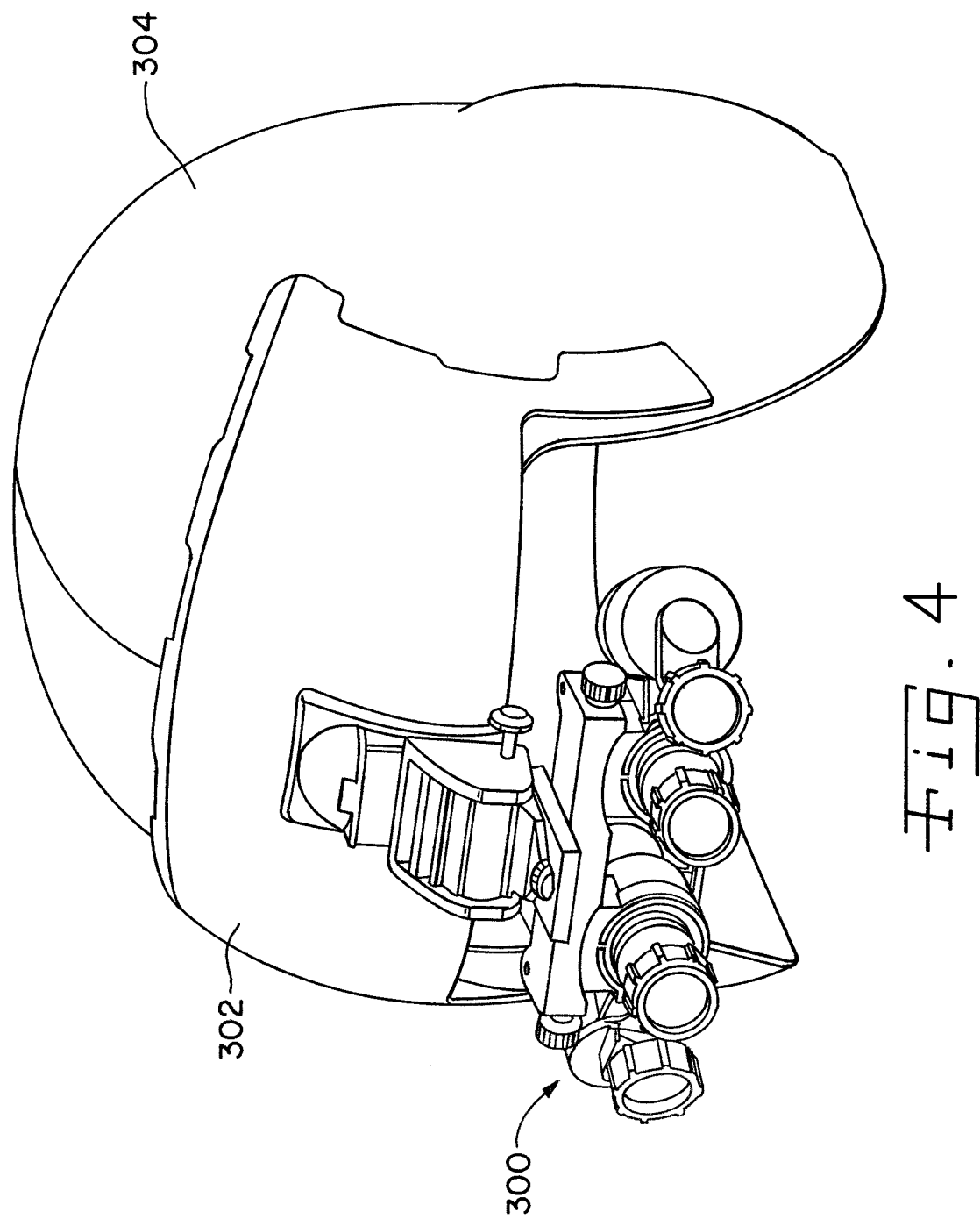
FIG. 4 is a front perspective view of a first embodiment, a modular panoramic night vision goggle assembly as mounted to a helmet visor.
Figure 5:
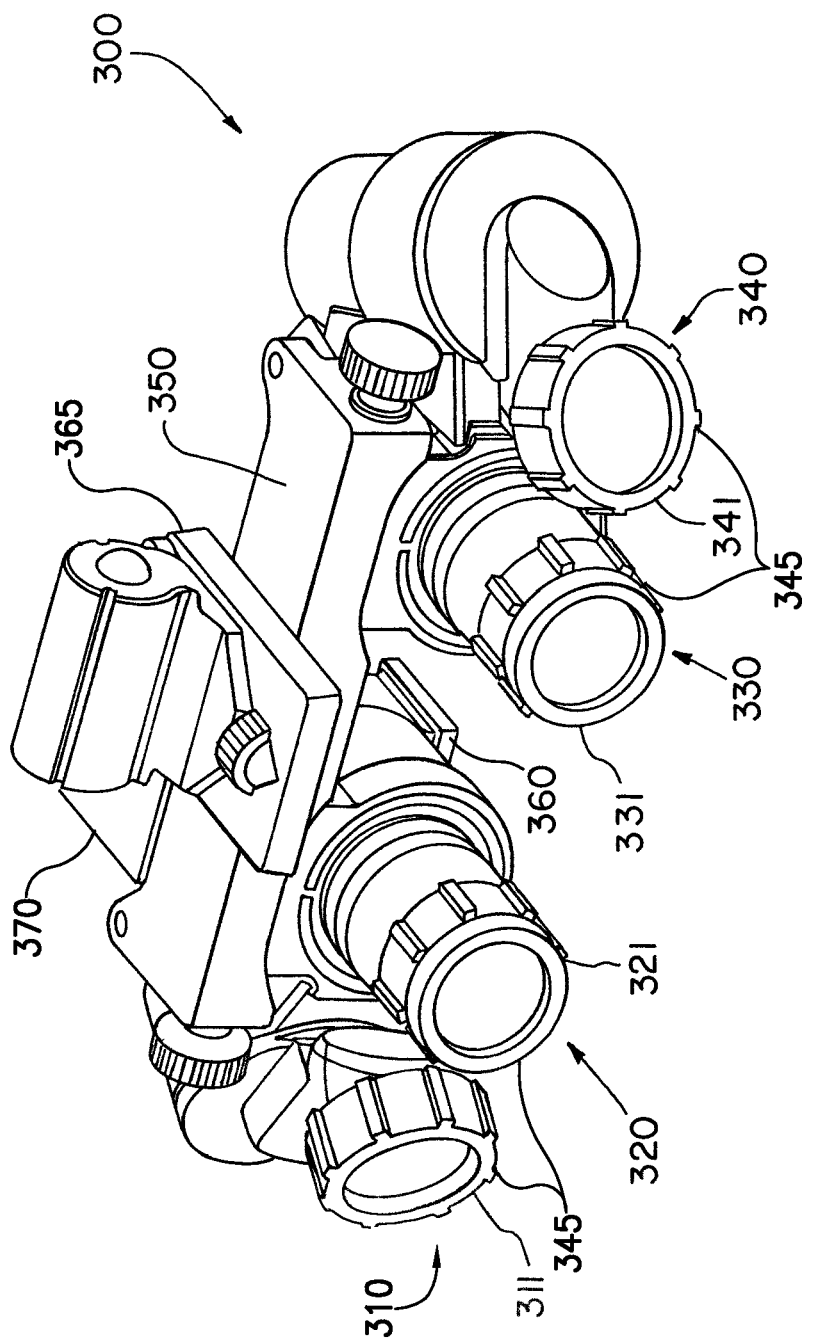
FIG. 5 is a front perspective view of the embodiment of FIG. 4 viewed in isolation from the helmet.
Figure 6:
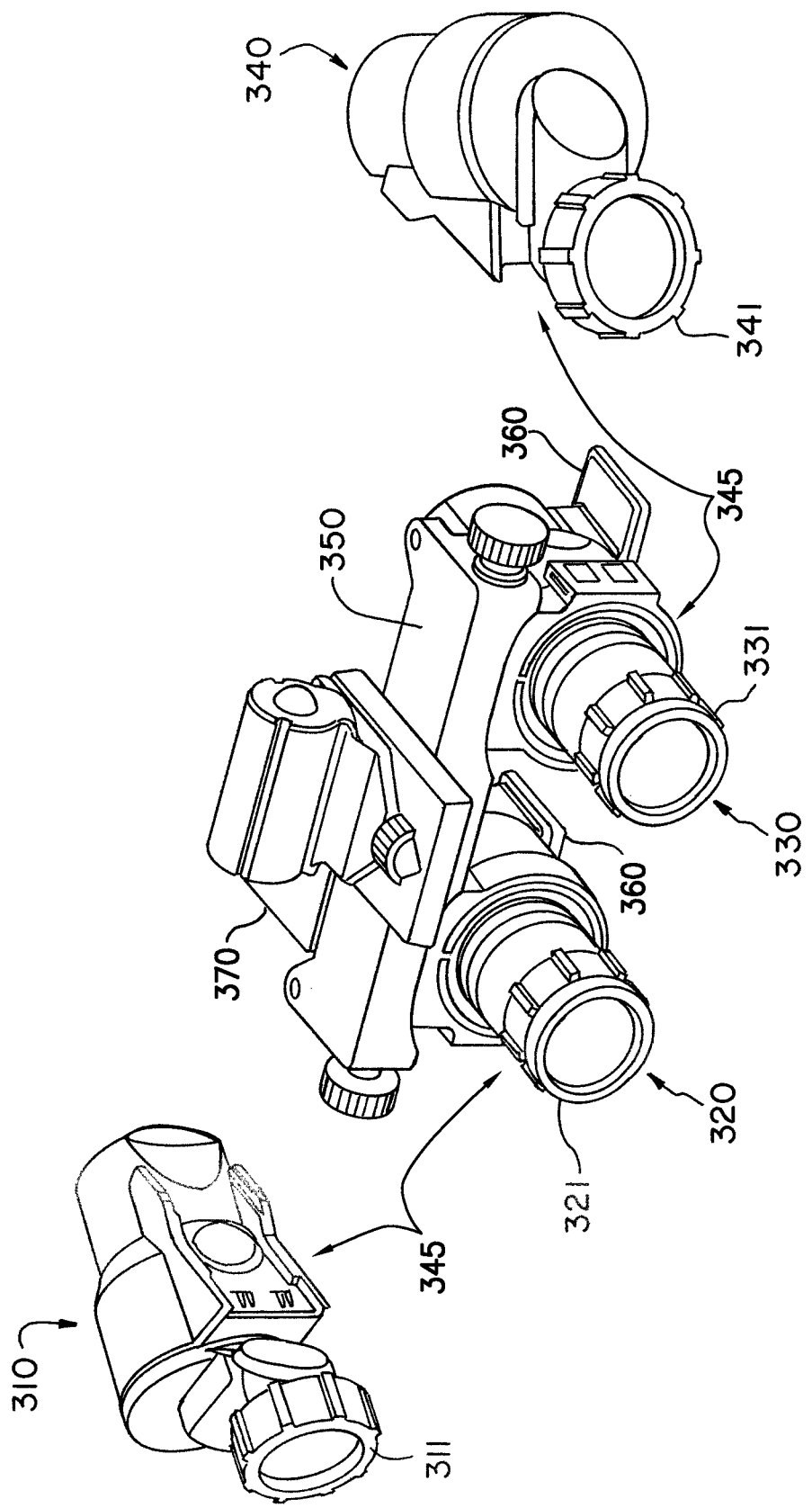
FIG. 6 is a front perspective view of the embodiment of FIG. 4 showing the outer optical modules detached from the inner modules.

FIGS. 4-5 present an embodiment of the present invention, a modular panoramic night vision goggle ("MPNVG") assembly 300, having modular, repeatably detachable/reattachable individual optical channels 310, 320, 330, 340. FIGS. 4 and 5 show the MPNVG assembly 300 mounted on (in FIG. 4) and unmounted from (in FIG. 5) the visor guard 302 of an HGU-56/P helmet 304 and includes four optical channels 310, 320, 330, 340 coordinated by a bridge 350. Bridge 350 is preferably provided with a mount 365 for releasably mounting the assembly to a helmet or visor as shown in FIG. 4. Modular assembly 300 may be affixed to the visor guard 302 by conventional means. Each of the four (4) optical channels 310, 320, 330, 340 provides image intensifier functionality in a separately sealed and self-contained optical module generically referred to as module 345. In preferred embodiments, inner channel modules 320 and 330 are mirror images of each other and are connectable directly to the bridge 350. In some embodiments the outer channel modules 310 and 340 are identical and interchangeable with one another. In any of these embodiments, removal of any single module 345 from the MPNVG assembly 300 will neither break any pressure seals nor degrade the optical, electrical, or intensifying performance of the removed module 345, nor of any remaining module. When a module 345 is removed, the functionality of that channel (its optical transmission, HUD presentation, or information capture, for example) is lost from the system, of course, but the remaining modules continue to perform their respective functions.

Figure 11:
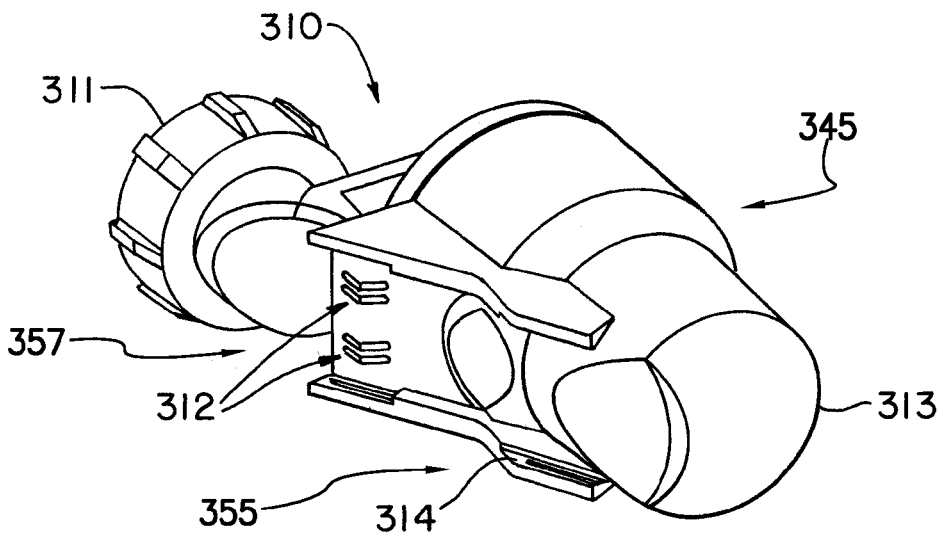
FIG. 11 is a perspective view of an outer optical module of FIG. 6.
Figure 13:
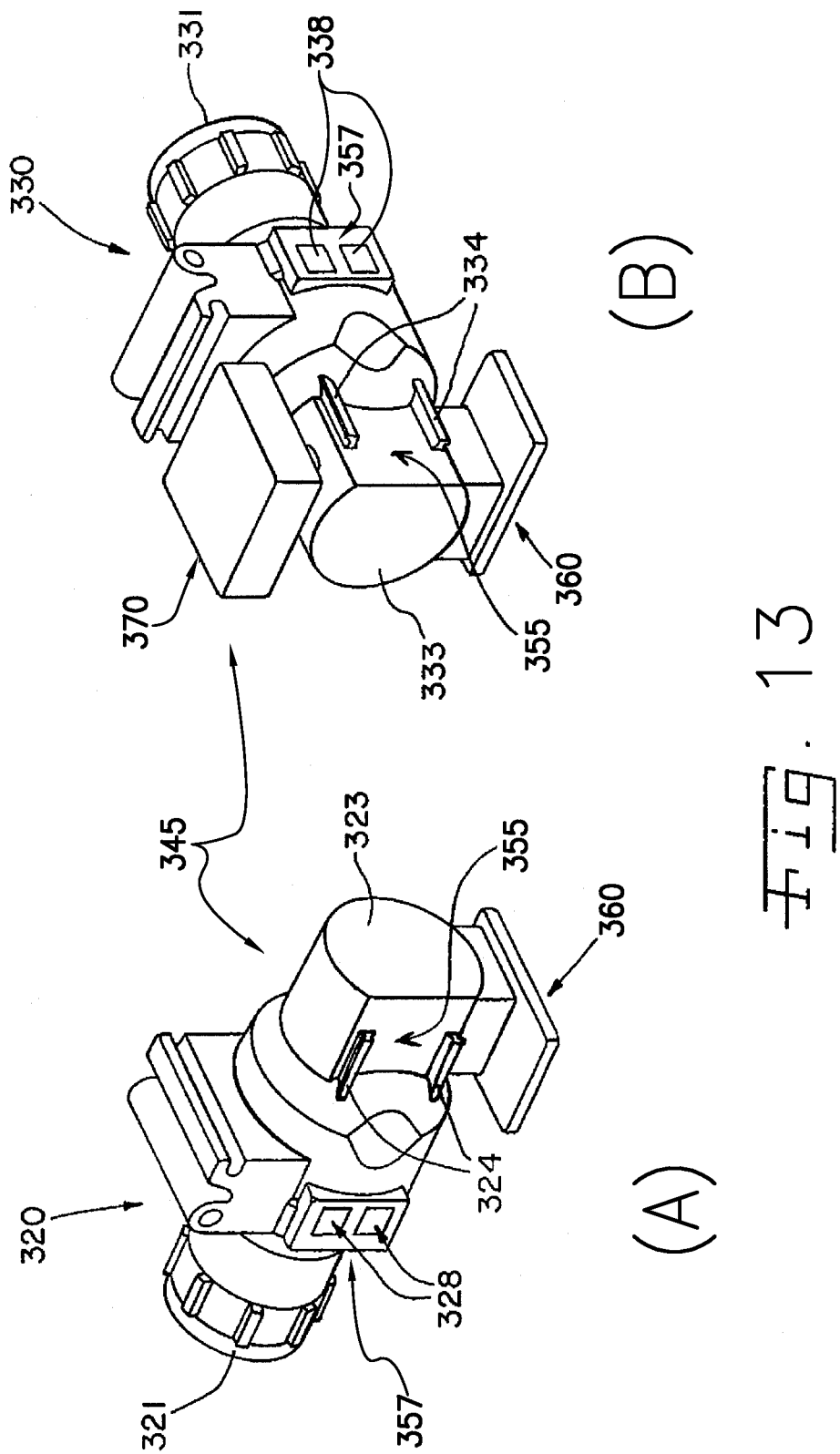
FIG. 13 is an enlarged perspective view of the inner left and inner right optical modules of the embodiment of FIG. 4.

Electrical power and information required by a module 345 are provided through electrical connectors 357 between each adjacent pair of modules 345, as well as between the inner modules 320, 330 and the bridge 350. Such electrical connectors 357 are typically connector port assemblies and include, in various example embodiments, spring-loaded wiper contacts 312 provided on the outer optical modules 310, 340 (as shown in better detail in FIG. 11) and contact pads 328, 338 provided on the inner optical modules 320, 330, respectively (as shown and discussed in relation to FIG. 13). Likewise, the electrical connection between a module 345 and the bridge 350 may include spring-loaded wiper contacts 312 provided on the bridge 350 and contact pads 328 provided on the module 345 and oriented to matingly connect to the wiper contacts 312 when the module 345 is mechanically engaged with the bridge 350. Alternately, other types of electrical connectors 357 may be chosen to establish module-to-module and/or module-to-bridge electrical communication. With any of these connector types, both power and data are transmitted from one module to the next, and to and from bridge 350 using the structures and techniques that will occur to those skilled in the art. In some embodiments, electrical paths are provided so that power for all modules comes from bridge 350, passing to outer modules 310, 340 and other attached modules (such as the HUD and camera modules) through the inner modules 320, 330. Parallel circuitry is preferably provided so that a malfunction in or damage to an inner module does not disrupt this flow of power. Likewise, data acquired or required by each module is transmitted through the electrical connectors to the appropriate destination using techniques known to those skilled in the art.

In alternative embodiments, each optical module 345 attaches directly to the bridge 350, which provides power and data through electrical connections as will occur to those skilled in the art. In some of these embodiments HUD module 360 and camera 370 are attached to bridge 350, while in others they are each attached directly to an optical module 345, and in the most preferred embodiments they are attached to the same inner module 320 or 330. In any of these forms, power and data are transferred between the components through wiper contacts and pads, pins and sockets, suitable connectors distributed by Hirose Electric Co., Ltd., or other electrical connection means as will occur to those skilled in the art.

Each module 345 includes attachment means, preferably defined by mechanical connection port 355, that ensures proper positioning and alignment of adjacently mating modules. Likewise, mechanical connection ports 355 are also provided to connect modules 345 to the bridge 350 in proper position and alignment. As shown best in FIGS. 11, 13 and 14, the mechanical connection port 355 may include tongue-and-groove type connectors 314, 324, 334, by which each module 345 is slidably received by and secured to an adjacent module 345. In this embodiment, the integral electrical connectors 357 typically present on each module 345 (such as wiper contacts 312 and contact pads 328 and 338) enable the electrical connection between adjacent modules 345 to be made simultaneously with the mechanical attachment of the modules 345. In other embodiments, electrical and data connections are made separately by way of, for example, cable connectors, fiber optic relays, or the like extending between adjacent modules 345. In yet other embodiments, the mechanical and electrical connectors 355, 357 are unitary or coextensive with each other. In still other embodiments, the mechanical connection port 355 includes one or more alignment features and a release feature that holds the module 345 in a fixed alignment relative to the component with which it is connected, and releases the module 345 when the release feature is actuated, as is known in the camera/tripod art. In any of these embodiments, the components of system 300 are electrically, mechanically, and optically modular.

Figure 14:
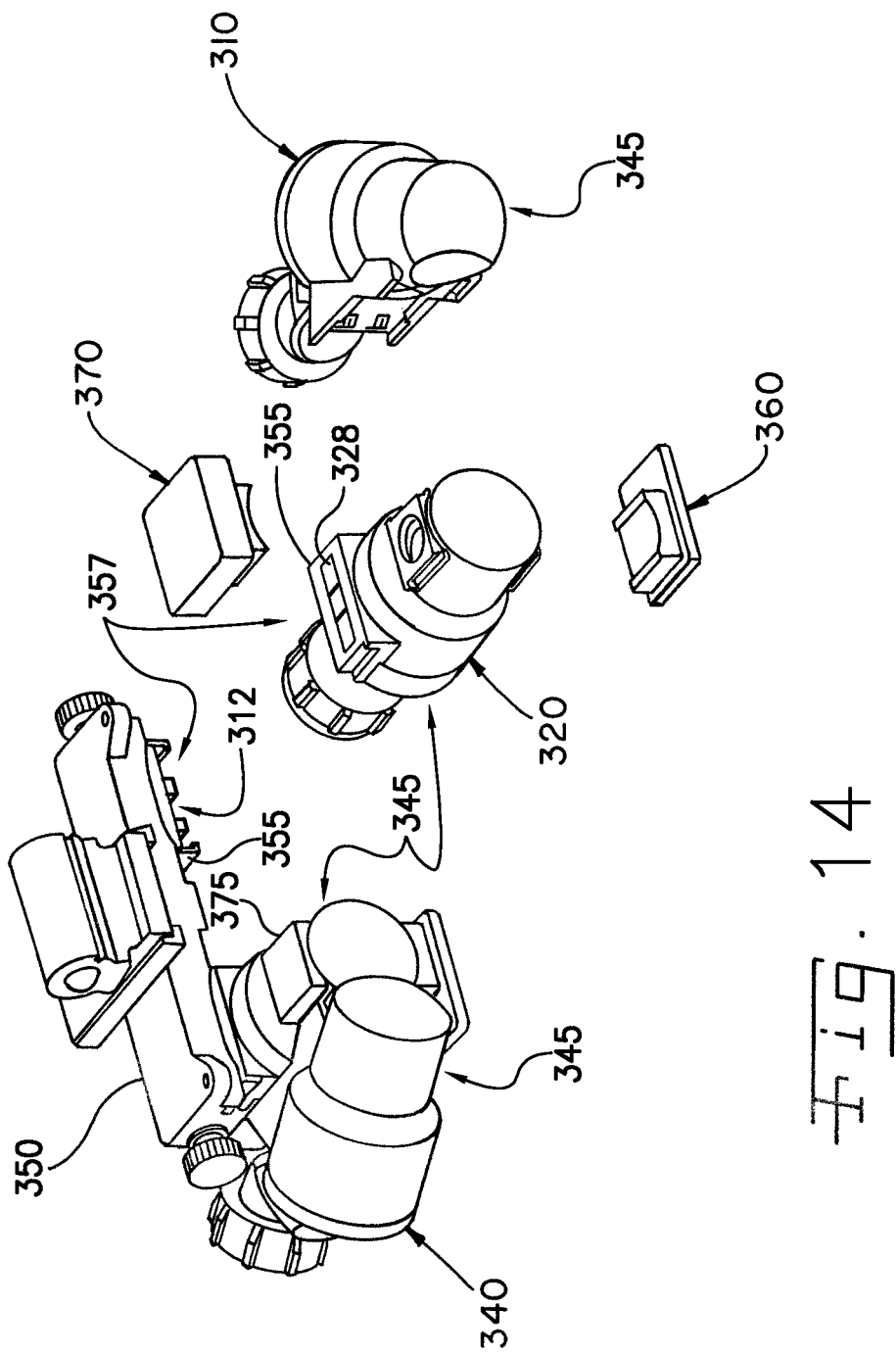
FIG. 14 is an exploded view showing the separate modular elements, including a camera, forming the modular 4-channel panoramic night vision assembly of the embodiment of FIG. 4.

In addition to the modularity of the four primary optical channels 310, 320, 330, 340 of the MPNVG assembly 300, a removably reattachable modular heads-up display, or "HUD," 360 and a removably reattachable modular camera 370 are included in some embodiments of the MPNVG assembly, as shown in FIG. 14. Similar to the individual optical modules 345, each of these modular components 360, 370 is separately sealed and self-contained. In some embodiments, modular camera 370 is of a type used with helmet assemblies for flight operations. When both modular camera 370 and HUD 360 are connected in electrical communication with one or more modules 345 and each other, camera 370 is able to record both scenery (from the module 345) and display data (from HUD 360). Removal of HUD 360 and/or camera 370 will not break any pressure seals or degrade the performance of the removed module 360, 370, nor of any of the optical modules remaining in the system. While, of course, the remaining modules would not have the benefit of the functionality of the removed module 360, 370, the functionality of the remaining modules would still be provided by the system. Again, electrical power and information (e.g., data signals and the like) provided or required by HUD 360 or camera 370 pass through the electrical connector 357 that is provided on each module 345, 360, 370.

A variety of data flow patterns may be used in various embodiments, depending for example on user preference, manufacturing convenience, and the available interface(s) to the connecting system. For example, in some embodiments, data is transmitted by wired connections from the aircraft to the HUD 360, through HUD connector to the optical module 320 or 330, passing through the optical module to the camera connector to camera 370, and back through the path to HUD 360 and to the aircraft. In alternative embodiments, the aircraft's signal cable might attach to the goggle system at an optical module 320, 330, and be sent to the HUD 360, while the output of camera 360 travels through the optical module 320, 330, to the aircraft. In still other alternative embodiments, the aircraft cable might attach to the bridge 350, which would distribute and collect signals to and from the optical module 320, 330, HUD 360, and camera 370. In yet other embodiments, communication between the aircraft and the goggle system might happen over radio frequency (RF) links using well known wireless technology.

One advantage of certain embodiments of the present invention is that users can attach the HUD 360 to either inner module 320, 330, so that the information provided by the HUD is seen by the user's dominant eye. Further, since camera 370 can be attached to either inner module 320, 330, camera 370 can record precisely the combination of intensified image and HUD display that the user sees through his or her corresponding eye.

Figure 9:
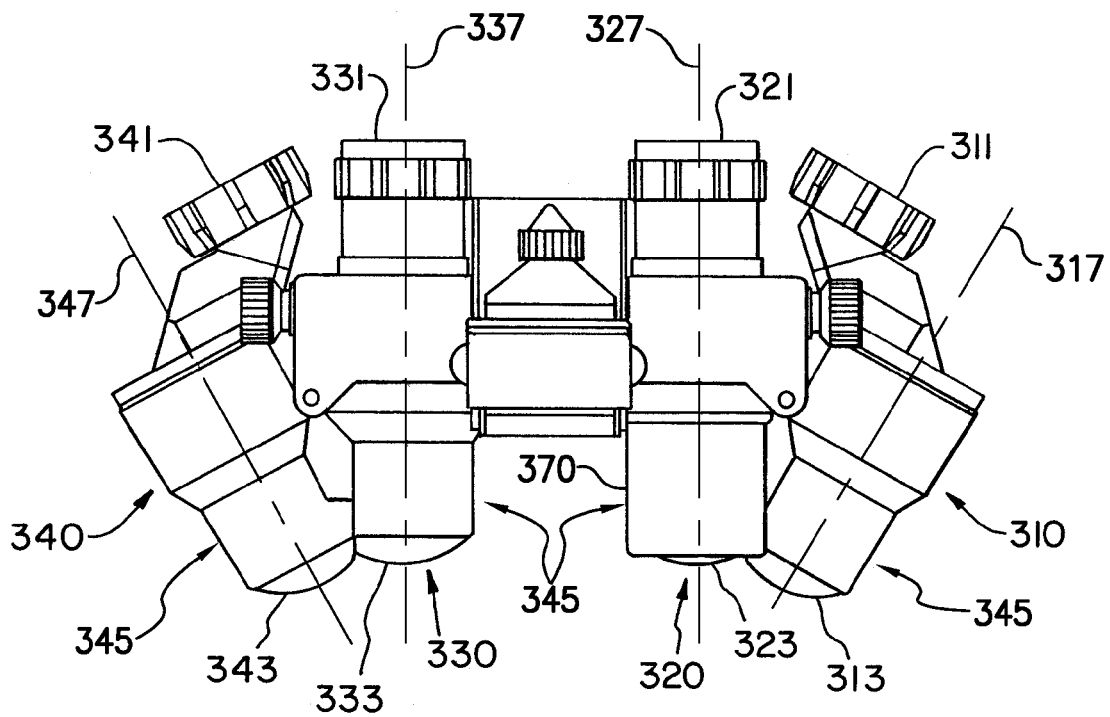
FIGS. 9 and 10 are top and rear plan views, respectively, of the 4-channel panoramic embodiment of FIG. 4.
Figure 10:
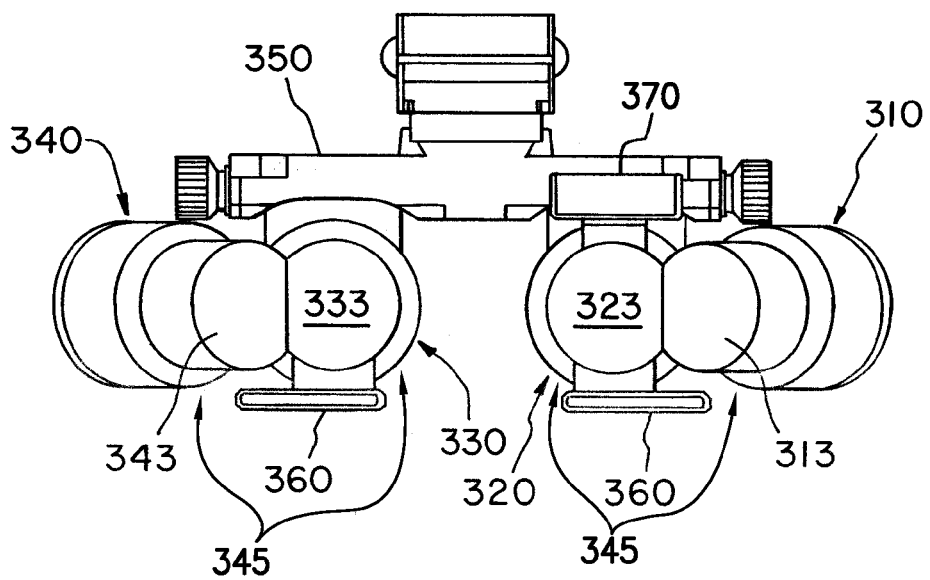
Figure 12:
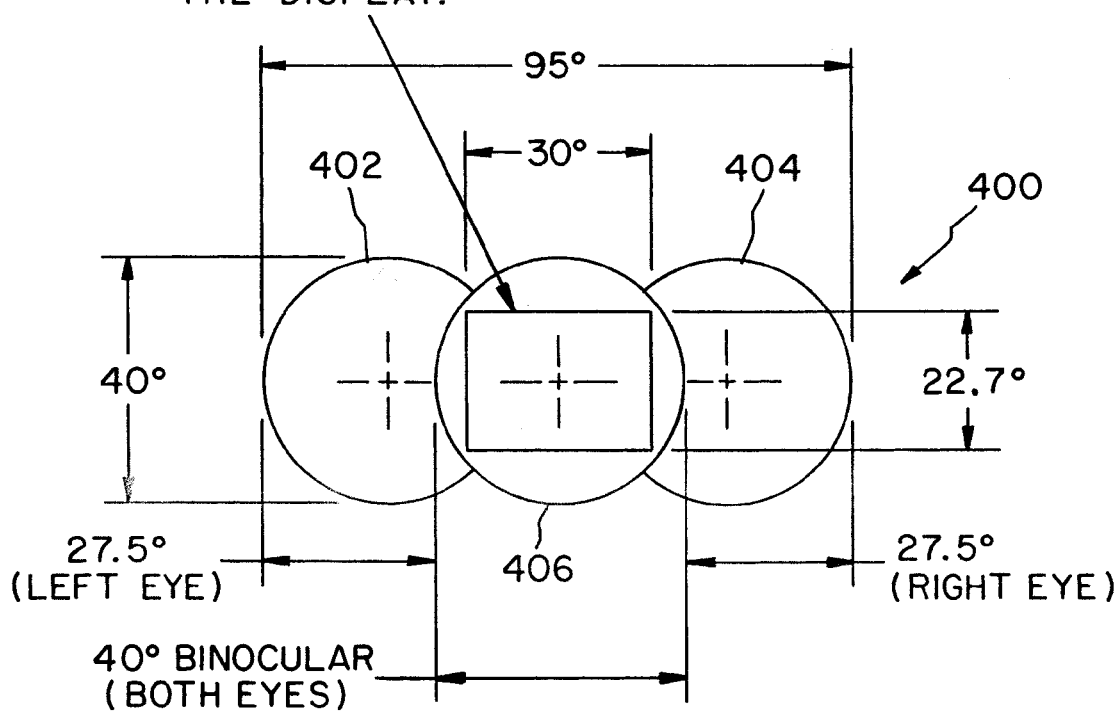
FIG. 12 is a schematic view of the field of view generated by the 4-channel panoramic embodiment of FIG. 4.

The field of view 400 generated by the light simultaneously transmitted along the four optical axes 317, 327, 337, 347 of the optical modules 310, 320, 330, 340 is schematically shown in FIGS. 9 and 12. The field of view 400 results from the combination of the overlapping sub-fields of view from the output ends of the optical modules. The field of view 400 includes two monocular portions 402, 404, and a 40-degree binocular portion 406 (i.e., the central overlap portion). The field of view 400 in the illustrated embodiment has a vertical field of view of approximately 40 degrees and a total horizontal field of view of approximately 100 degrees.

In some embodiments, the outer optical modules 310, 340 are identical and interchangeable. In some forms, such a module 310, 340 may be simply turned about its longitudinal axis to serve as either the right outer module 310 or left outer module 340. The right inner module 320 and left inner module 330 may be identical and interchangeable, or may be designed as mirror images of each other. In other forms, the module 310, 340 are identical, and can be removed and transposed between the left-outer position and the right-outer position as necessary or desired. In an alternative embodiment, all of the modules 345 (right and left, inner and outer) may be designed to be identical and universally interchangeable; i.e., any given optical module 345 may serve as a right or a left inner module or as a right or left outer module.

Figure 7:
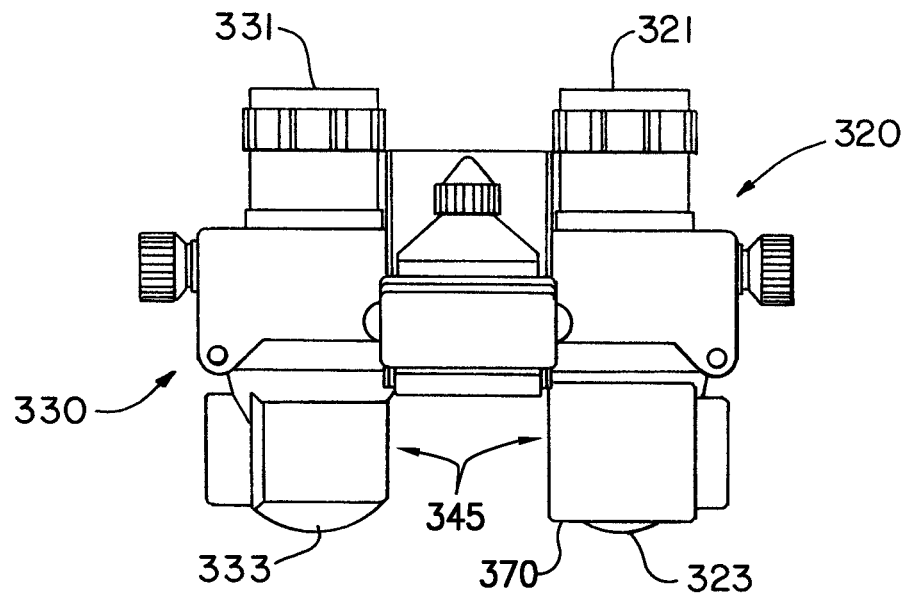
FIGS. 7 and 8 are top and rear plan views, respectively, of the binocular-like embodiment of FIG. 6.
Figure 8:
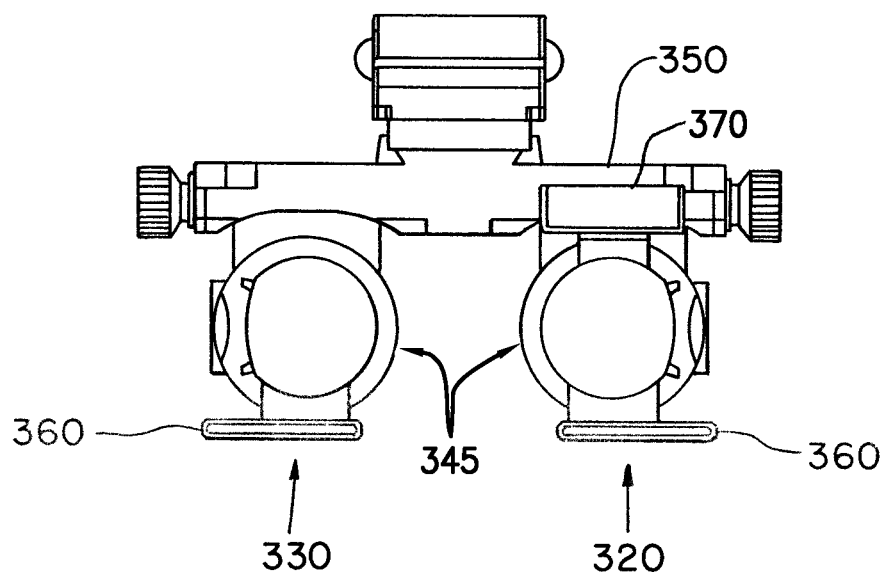

A significant advantage provided by complete modularity in some embodiments is that one can employ, if desired, the dual-channel embodiment of this assembly as shown in FIGS. 7 and 8, comprising only the inner optical modules 320, 330 and the bridge 350. One can then add HUD 360 and camera 370 if desired. This allows an end user to purchase only the dual-channel modular version of the invention as its finances permit and, as needed or as finances permit, to purchase separately additional universal optical modules 345 connectable as outer modules 310, 340 to convert the dual-channel unit to a 4-channel panoramic unit. This availability is particularly beneficial for developing countries with limited military budgets. This also allows the dual-channel assembly to be used by persons who need no- or low-light visibility, but who do not need panoramic capability, such as aircraft or ground crew other than the pilot(s). Further, this embodiment allows additional outer modules 310, 340 to be redistributed to selectively upgrade dual-channel systems as needed, allowing the acquisition of relatively few outer channel modules 310, 340 to effectively upgrade a much larger number of dual-channel units (where not all are required to simultaneously function as panoramic units.)

From an operations standpoint, each optical module 345 is designed to receive light from an object being viewed at an input end 311, 321, 331, 341, and to transfer an image of the object to the input end of an internal image intensifier (not shown). The image intensifier makes it possible for the observer to view an object in dark conditions by receiving the visible and/or infrared light image of the object transferred to the input end thereof. The image intensifier converts the received image to an intensified visible output image in a predetermined narrow band of wavelengths at its output end. For example, the image intensifier may include a GaAs photocathode at its input end. An optical transfer system transfers the received light to an output end 313, 323, 333, 343 of each module.

Figure 15:
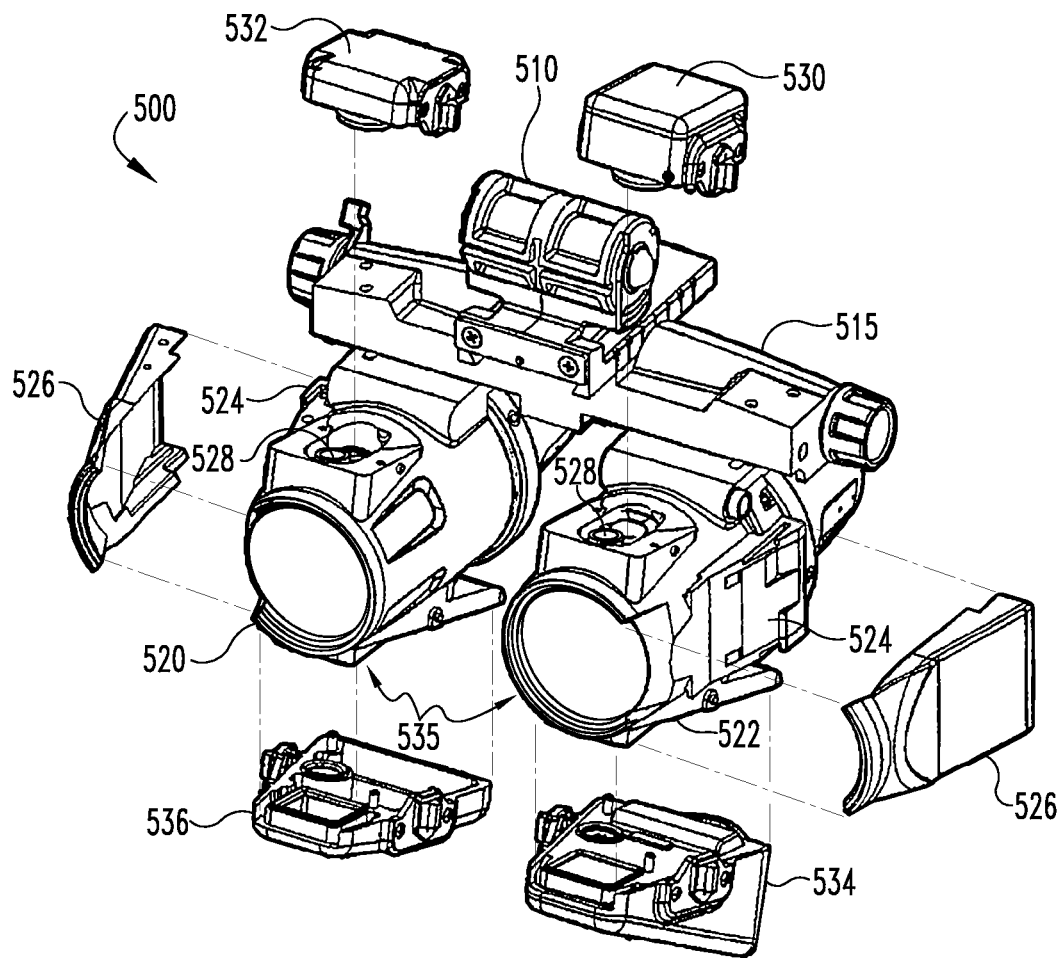
FIG. 15 is an exploded view of a narrow-view form of a second modular vision system.

Another embodiment, goggle system 500, is shown in FIGS. 15-20. FIG. 15 illustrates a narrow-view (inner modules only) night vision goggles system 500. The system attaches with ANVIS mount 510 to a pilot's helmet, which supports the structure in a position suspended before the pilot's eyes. ANVIS mount 510 holds a bridge 515 in a fashion that allows adjustment of the goggle, either closer to or further away from the pilot's eyes, tilting the optical channels up or down, and changing the interpupillary distance. Bridge 515 supports optical modules 520 and 522, which provide intensified imaging for the pilot's left and right eyes, respectively. In this 2-optical-channel embodiment, physical and electrical connectors at 524 are not needed to secure, power, and communicate with outer channels, so each outer side of inner modules 520, 522 is covered with a side cover 526.

Each of the inner modules 520, 522 includes a port 528 to which a camera module 530 can be attached. As shown in FIG. 15, camera module 530 can be placed into port 528 of right inner module 522 so that camera module 530 records what is seen by the pilot through his or her right eye. The optical operation of this view capture will be discussed in more detail below. The camera port cover 532 provides no recording functionality, but fits into port 528 of left inner module 520 to protect it from damage and foreign particles.

Similarly, this HUD module 534 connects to HUD port 535 on the bottom side of optical module 522. HUD module 534 adds a heads-up display to the image seen by the user and recorded by camera module 530 (if it is installed). Bottom port 535 of optical module 520 is covered by HUD port cover 536, providing protection from foreign objects and light, and against physical damage to the port 535 and/or optical channel 520.

Figure 16:
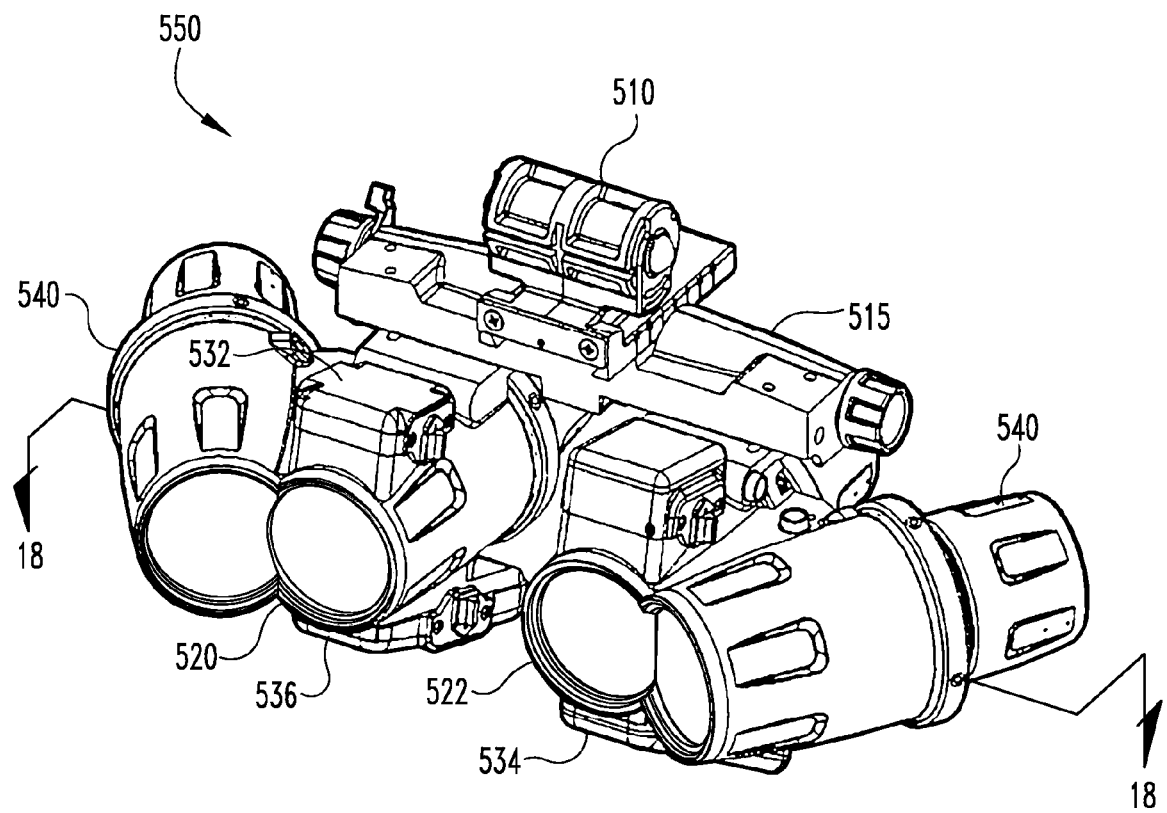
FIG. 16 is a perspective view of a wide (panoramic)-view form of the second modular vision system.

FIG. 16 shows system 550, which expands the narrow-view system 500 into a wide (panoramic) form 550. As in FIG. 15, bridge 515 supports inner modules 520 and 522, and inner module 522 is fitted with camera module 530 and display module 534. Left inner module 520 has camera port 528 and HUD port 535 covered with camera port cover 532 and HUD port cover 536, respectively, as also seen in FIG. 15. In panoramic system 550, however, outer channel 540 is attached to left inner channel 520, and another outer channel 540 is attached to right inner channel 522, altogether providing the panoramic, intensified view discussed above. It is noted that camera 530 and HUD 534 can each be placed in the corresponding port on either inner module 520, 522. This flexibility allows a pilot to have the HUD display from HUD module 534 shown to his or her dominant eye, while retaining the ability to capture the intensified image and HUD concurrently with substantially perfect registration (of the HUD display on the intensified image) relative to what the user sees.

Figure 17:
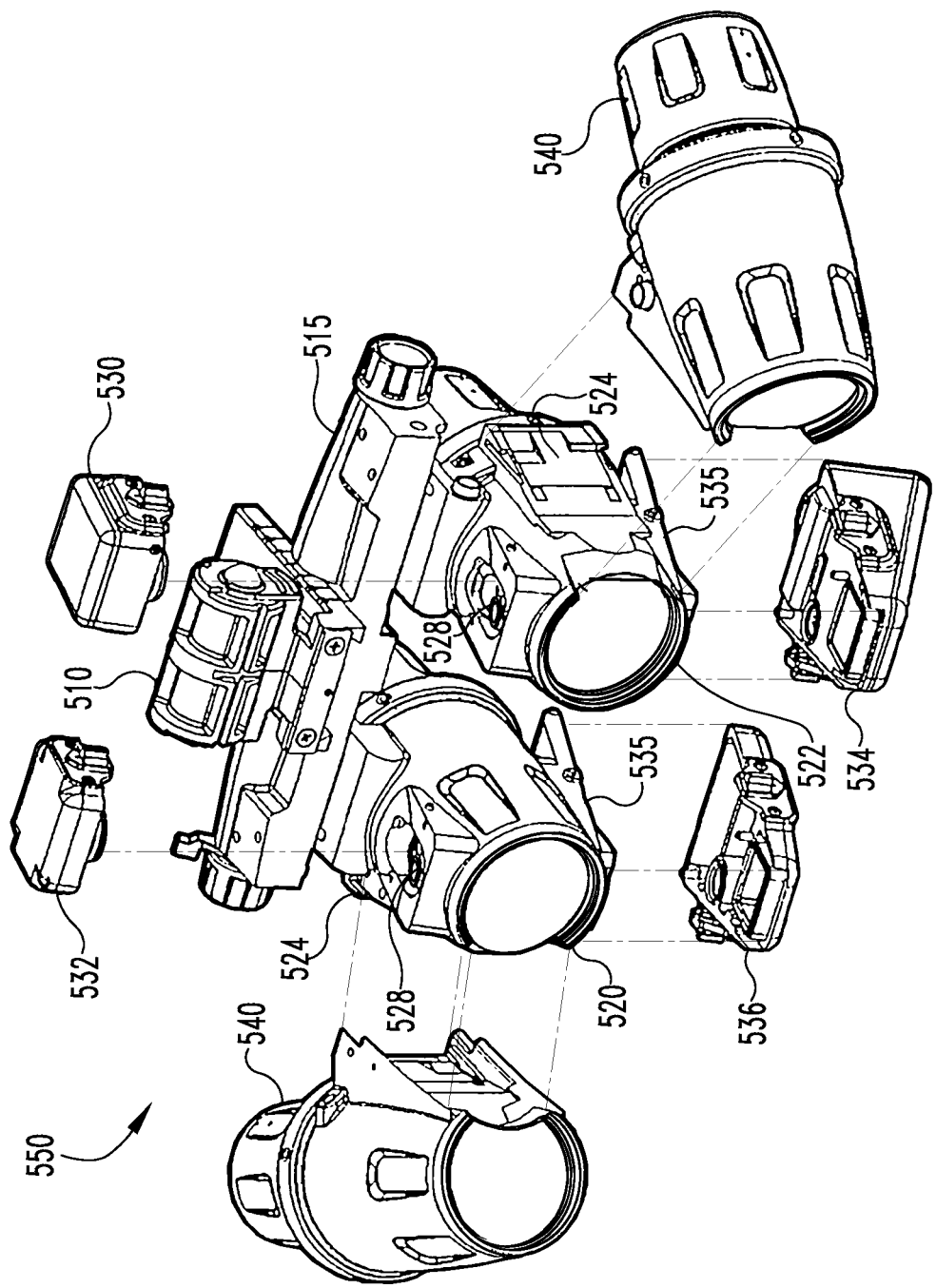
FIG. 17 is an exploded view of the modular vision system of FIG. 16.

FIG. 17 illustrates the same system as 550 in an exploded view. Here connectors 524 on the outer sides of inner modules 520 and 522 can be seen in position for receiving outer module 540. Similarly, camera port 528 and display port 535 are shown in condition for receiving camera 530 (or camera port cover 532) and HUD 534 (or lower port cover 536), respectively.

Figure 18:
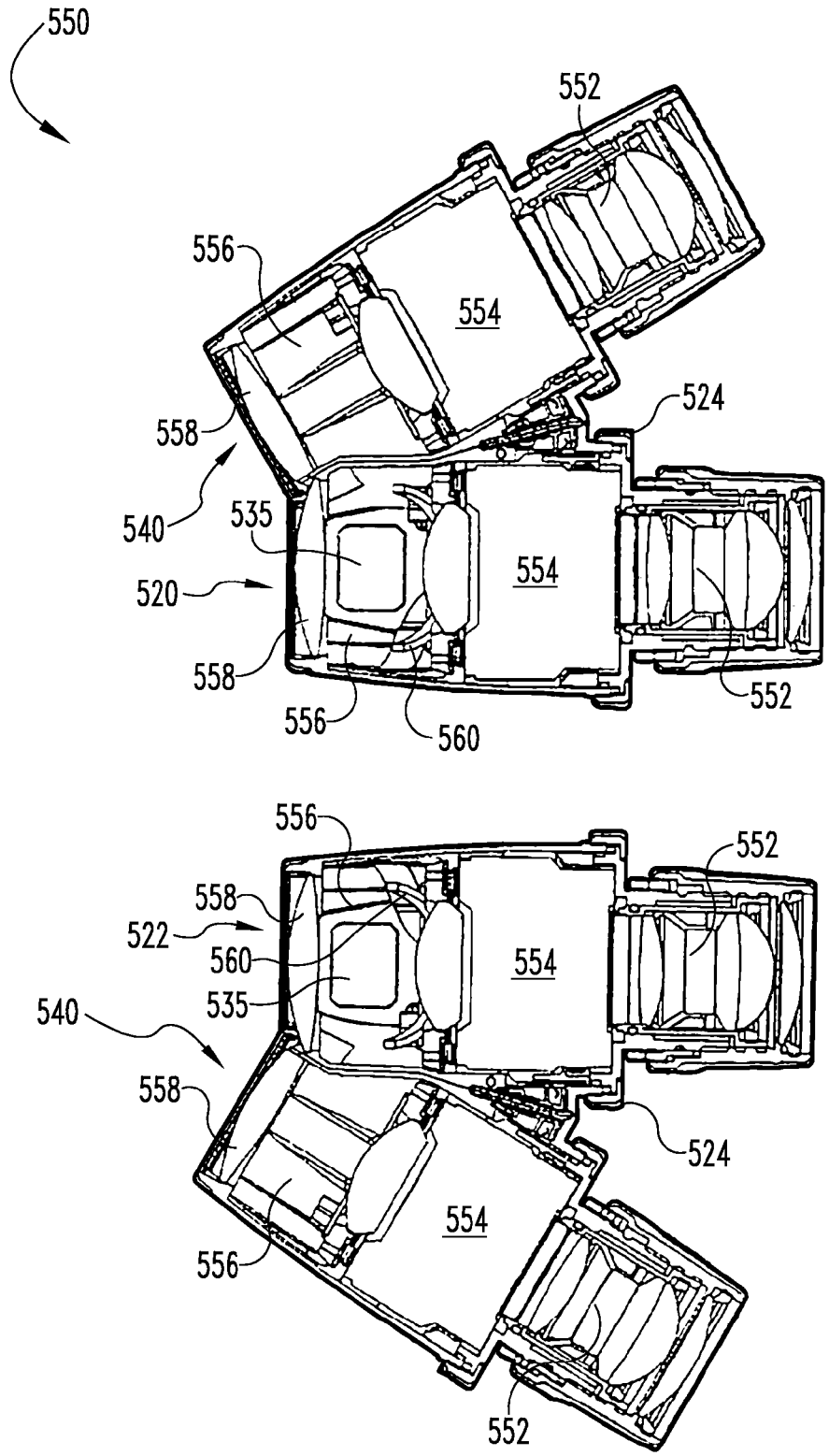
FIG. 18 is a horizontal sectional view of the modular vision system of FIG. 16.

FIG. 18 is a horizontal cross-section of a panoramic system similarly shown in FIG. 15. In each optical module 520, 522, and (both) 540s, an objective lens system 552 collects light from the field of view and focuses it on image intensifier and image intensifier 554. Image intensifier 554 converts the received light into an intensified image used in techniques known to those skilled in the art, and transmits the intensified image through cavity 556 to eyepiece lens 558. While each optical module 520, 522, 540 includes cavity 556 between image intensifier 554 and eyepiece lens 558 (providing a common housing and assembly design up to that point), inner optical modules 520 and 522 also include pellicle 560 in that cavity as will be discussed below. The optical designs of the inner and outer modules in some embodiments are the same except for placement of this pellicle 560, making for an efficient manufacturing operation.

In the illustrated embodiment, pellicle 560 is a very thin (2 to 10 micron) membrane made of nitrocellulose or similar material. That material is bonded to a flat (optically lapped) ceramic or metal frame. While thin glass or glass prism combiners might be used, pellicle-type combiners are typically lighter in weight and very simple to use in the optical path of an eyepiece assembly. Because of their thinness, pellicles can be added to an optical system without any significant optical effect. In the present embodiment, each of the two inner channels 520, 522 has a pellicle-type combiner, while the two outer channels 540 do not, and they are all otherwise optically identical as shown in FIG. 18. In alternative embodiments using prism type combiners, a different optical design that compensates for the combiner's thickness would be required for the eyepieces and the system would be much longer and heavier.

Pellicle-type combiners are further preferred because ghost images are essentially eliminated by the thinness of the pellicle membrane as the second surface reflection is superimposed on the first surface reflection. In addition, the pellicles can be coated to reflect any desired wavelengths or, if left un-coated, will reflect approximately 8% and pass 92% of the incident light energy, as used in this embodiment. Because of thinness of the pellicle, the reflected images from the display to the eye and from the intensifier to the camera are reflected from substantially the same surface and appear to be identically positioned because they provide substantially identical relative positioning for the recorded image as compared to an image seen by the user. Prism-type combiners do not provide the same positioning as pellicle-type combiners.

Each optical module, including the outer optical modules, may include mounts for the pellicle, camera port and HUD port, but otherwise be substantially identical.

Figure 19:
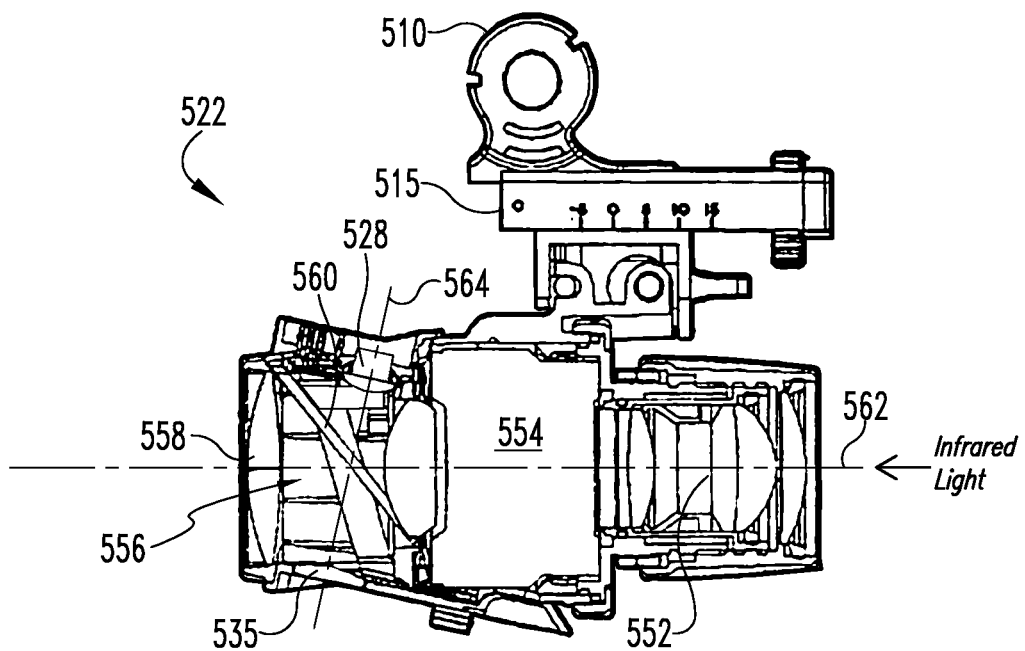
FIG. 19 is a vertical sectional view of an inner optical channel in the modular vision system of FIG. 16, without a camera module or a HUD module.

FIG. 19 is a side-sectional view of right inner optical module 522 illustrating optical paths and some attachment features of the present embodiment. As discussed above, in relation to FIGS. 16-18, ANVIS attachment 510 connects the pilot's helmet to bridge 515, which in turn supports the remaining structures in goggle system 550. Light enters optical module 522 from the right centered about optical axis 562, passing first through objective lens system 552 to image intensifier 554. Image intensifier 554 intensifies the image and retransmits it further to the left into cavity 556 and to pellicle 560. Part of the light from image intensifier 554 is reflected by pellicle 560 and exits on housing of optical channel 522 at camera port 528. The rest of the light from image intensifier 554 continues through eyepiece lens 558 to the user.

Figure 20:
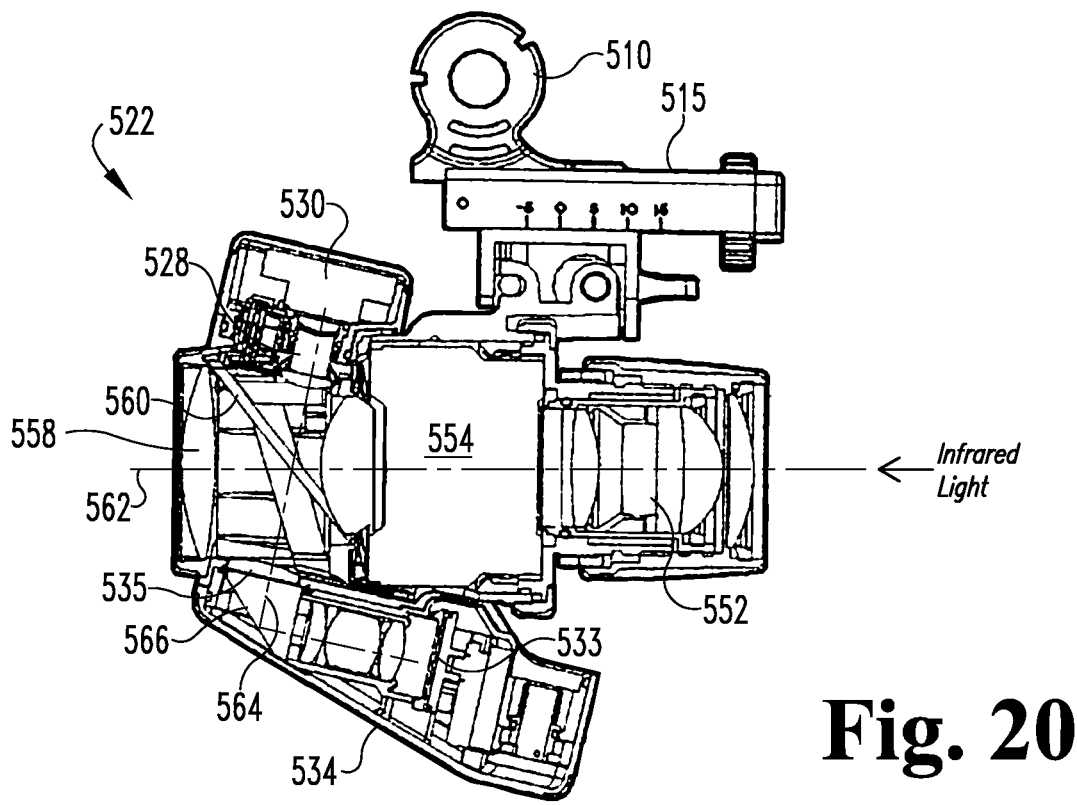
FIG. 20 is a vertical sectional view of an inner optical channel in the modular vision system of FIG. 16, with a camera module and a HUD module attached.

Similarly, as illustrated in FIG. 20, when HUD module 534 is in place, the HUD display enters optical module 522 through HUD port 535 along optical axis 564. Part of the light is reflected off pellicle 560 to the user along optical axis 562, while the rest continues through pellicle 560 and camera port 528 along optical axis 564 to camera module 530 when camera module 530 is present.

FIG. 20 is another side-sectional view of optical module 522, with camera module 530 and HUD module 534 as shown in FIG. 16. In FIG. 20, as in FIG. 19, light enters the optical module 522 from the right through objective lens system 552 to image intensifier 554. The intensified image continues to the left along axis 562, and is split by pellicle 560 so that a portion of the light reflects upward through camera port 528 into camera module 530, while the rest continues along axis 562 through eyepiece lens 558 to the user.

Meanwhile, in the illustrated embodiment, HUD module 534 generates a heads-up display using organic light-emitting diode (OLED) type display chip 533, and reflects the display image off prism 566 onto optical axis 564 and through HUD port 535. When the HUD display reaches pellicle 560, a portion of the light is reflected onto optical axis 562 to the user's eye, while the remaining light proceeds through camera port 528 to camera module 530.

It will be observed that the intensified image and HUD image appear at the user's eye and at camera module 530 in substantially the same alignment by operation of pellicle 560. This substantially perfect registration is very beneficial to those evaluating the performance of the pilot, the night vision system, the aircraft, and armaments that have been deployed, for example.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A system comprising:
   a night vision module comprising:
      a module housing having a first end, a second end, and a camera port;
      an image intensifier that receives energy through the first end and generates an intensified image;
      a pellicle situated in the optical path between the image intensifier and the second end so that the camera port and the second end receive substantially identical intensified images, wherein the module housing further comprises an attachment port adapted for removably attaching an outer optical module in a position that adds to the horizontal field of view of an eye at the second end of the night vision optical module; and
   an outer optical module, removably attached to the night vision optical module and comprising:
      a housing having a first end and a second end; and
      an image intensifier situated in the housing that receives an image through the
      first end and passes an intensified version of the image out through the second end;
   wherein when the outer optical module is attached to the night vision optical module, expands the horizontal field of view of that optical module.

2. The system of claim 1, wherein:
   the outer optical module is removably attached to the night vision optical module; and
   when the outer optical module is removed, the removal does not detrimentally affect the functionality of the night vision optical module.

3. The system of claim 1:
   further comprising a second night vision optical module;
   wherein the outer optical module and the two night vision optical modules are configured so that the outer optical module is removably attachable to either of the night vision optical modules.

4. The system of claim 1, wherein the outer module:
   is contained within an outer module housing that is reattachably separable from the
   housing of the night vision optical module;
   comprises an electrical connector that electrically connects the outer module housing to
   the housing of the night vision optical module; and
   transfers power through the electrical connector.

5. A system comprising
   a night vision optical module comprising:
      a module housing having a first end, a second end, and a display port, the display port being separated from the first end;
      an image intensifier that receives energy through the first end and generates an intensified image;
      a pellicle situated in the optical path between the image intensifier, the display port, and the second end so that the second end receives an overlaid combination of the intensified image
      and an image entering through the display port,
   wherein the module housing further comprises an attachment port adapted removably attaching an outer optical module in a position that adds to the horizontal field of view of an eye at the second end of the night vision optical module;
   an outer optical module, removably attached to the night vision optical module comprising:
      a housing having a first end and a second end; and
      an image intensifier situated in the housing that receives an image through the
      first end and passes an intensified version of the image out through the second end;
   wherein when the outer optical module is attached to the night vision optical module, expands the horizontal field of view of that optical module.

6. The system of claim 5, wherein:
   the outer optical module is removably attached to the night vision optical module; and
   when the outer module is removed, the removal does not detrimentally affect the
   functionality of the night vision optical module.

7. The system of claim 5:
further comprising a second night vision optical module;
wherein the outer optical module and the two night vision optical modules are
configured such that the outer optical module is removably attachable to the attachment port of
either of the night vision optical modules.

8. The system of claim 5, wherein the outer module:
is contained within an outer module housing that is reattachably separable from the optical module housing;
comprises an electrical connector that electrically connects the outer module housing to the system; and
transfers power through the electrical connector.

9. A system comprising two night vision optical modules, the night vision optical modules each comprising:
a module housing having a first end, a second end, and a camera port;
an image intensifier that receives energy through the first end and generates an intensified
image; and
a pellicle situated in the optical path between the image intensifier and the second end so
that the camera port and the second end receive substantially identical intensified images; the optical modules being mechanically connected to be visible by respective eyes of a user; and
together providing a stereoscopic view of intensified images and
further comprising a first and a second outer optical module, each removably attached to
a different one of the night vision optical modules and comprising:
a housing having a first end and a second end; and
an image intensifier situated in the housing that receives an image through the
first end and passes an intensified version of the image out through the second end;
wherein each of the outer optical modules expands the horizontal field of view of the
night vision optical module to which it is attached.

10. A system comprising two night vision optical modules, each night vision optical module comprising:
a module housing having a first end, a second end, and a display port, the display port
being separated from the first end;
an image intensifier that receives energy through the first end and generates an intensified
image; and
a pellicle situated in the optical path between the image intensifier, the display port, and
the second end so that the second end receives an overlaid combination of the intensified image and an image entering through the display port, the night vision optical modules being mechanically connected and together providing a stereoscopic view of intensified images, the system further comprising a first and a second outer optical module, each removably attached in a position alongside a different one of the night vision optical modules and comprising:
a housing having a first end and a second end; and
an image intensifier situated in the housing that receives an image through the first end and passes an intensified version of the image out through the second end;
wherein each of the outer optical modules expands the horizontal field of view of the night vision optical module alongside which it is attached.

* * * * *